United States Patent
Lu et al.

(10) Patent No.: US 7,840,037 B2
(45) Date of Patent: Nov. 23, 2010

(54) ADAPTIVE SCANNING FOR PERFORMANCE ENHANCEMENT IN IMAGE DETECTION SYSTEMS

(75) Inventors: Juwei Lu, Toronto (CA); Hui Zhou, Toronto (CA); Mohanaraj Thiyagarajah, Scarborough (CA)

(73) Assignee: Seiko Epson Corporation, Tokyo (JP)

( * ) Notice: Subject to any disclaimer, the term of this patent is extended or adjusted under 35 U.S.C. 154(b) by 928 days.

(21) Appl. No.: 11/684,478

(22) Filed: Mar. 9, 2007

(65) Prior Publication Data
US 2008/0219558 A1   Sep. 11, 2008

(51) Int. Cl.
G06K 9/00 (2006.01)
G06K 9/48 (2006.01)
G06K 9/68 (2006.01)
G06K 9/70 (2006.01)

(52) U.S. Cl. .............. 382/118; 382/165; 382/199; 382/227

(58) Field of Classification Search ............ 382/118, 382/165, 199, 227
See application file for complete search history.

(56) References Cited

U.S. PATENT DOCUMENTS

| 2004/0170318 | A1 | 9/2004 | Crandall et al. |
| 2004/0179719 | A1 | 9/2004 | Chen et al. |
| 2004/0264744 | A1 | 12/2004 | Zhang et al. |
| 2005/0013479 | A1 | 1/2005 | Xiao et al. |
| 2005/0094854 | A1 | 5/2005 | Kim |
| 2005/0157933 | A1 | 7/2005 | Blake et al. |
| 2006/0062451 | A1* | 3/2006 | Li et al. ............ 382/159 |
| 2006/0120572 | A1 | 6/2006 | Li et al. |
| 2008/0107341 | A1* | 5/2008 | Lu .................... 382/190 |

* cited by examiner

*Primary Examiner*—John B Strege
(74) *Attorney, Agent, or Firm*—Mark P. Watson

(57) ABSTRACT

A method and system for efficiently detecting faces within a digital image. One example method includes identifying a digital image comprised of a plurality of sub-windows and performing a first scan of the digital image using a coarse detection level to eliminate the sub-windows that have a low likelihood of representing a face. The subset of the sub-windows that were not eliminated during the first scan are then scanned a second time using a fine detection level having a higher accuracy level than the coarse detection level used during the first scan to identify sub-windows having a high likelihood of representing a face.

17 Claims, 6 Drawing Sheets

ADAPTIVE SCANNING FOR PERFORMANCE ENHANCEMENT IN IMAGE DETECTION SYSTEMS

BACKGROUND

1. The Field of the Invention

The present invention relates to image processing. More specifically, the present invention relates to methods and systems for detecting the presence of objects, such as faces, within a digital image.

2. The Relevant Technology

Computer systems are increasingly used for detecting objects in digital images. For example, some computer systems are configured to examine a photographic digital image and detect the size and location of any human face within the image. At least one goal of face detection systems is to accurately detect facial features in a digital image and distinguish the facial features from other objects in the digital image. Patterns in a digital image that correspond with a face vary extensively and are highly complex, due to the variations in facial appearance, lighting, expressions, and other factors. As a result, face detection systems have become very complex.

Some common challenges in face detection systems are low detection rates and high false detection rates. For example, a face detection system may fail to detect one or more faces in a digital image. The face detection system may also falsely identify a non-face pattern in a digital image as a face. In order to improve the detection rates and the false detection rates, systems often scan an image at all possible locations and scales, resulting in a large number of sub-windows. However, this type of exhaustive search strategy can be very computationally expensive and time consuming.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One example embodiment of the present invention is directed to a method of adaptively scanning a digital image for face detection. The method includes identifying a digital image comprised of a plurality of sub-windows and performing a first scan of the digital image using a coarse detection level to eliminate the sub-windows that have a low likelihood of representing a face. The subset of the sub-windows that are not eliminated during the first scan are then scanned a second time using a fine detection level having a higher accuracy level than the coarse detection level, to identify sub-windows having a high likelihood of representing a face.

In addition to the method of adaptively scanning a digital image for a facial image, another example embodiment is directed to a face detection system. The example system includes a skin color based classifier for analyzing a digital image having a plurality of sub-windows during a first scan to eliminate the sub-windows that have a low likelihood of representing a face based on the colors of the sub-windows. The system also includes an edge based classifier coupled to the skin color based classifier for analyzing the digital image during the first scan to eliminate additional sub-windows that have a low likelihood of representing a face based on an edge magnitude of the digital image within the sub-windows. The edge based classifier is coupled to a boost classifier having a plurality of cascaded modules. At least a first portion of the cascaded modules are used for analyzing the digital image during the first scan to eliminate additional sub-windows that have a low likelihood of representing a face based on a first false-detect tolerance level. The subset of sub-windows that were not eliminated during the first scan are rescanned by a second portion of the cascaded modules to eliminate additional sub-windows that have a low likelihood of representing a face based on a second false-detect tolerance level that is lower than the first false-detect tolerance level.

A further example embodiment is directed to a method of adaptively scanning a digital image for face detection. The method may be practiced, for example, in a computer system that includes classifying modules for classifying an image. The method includes identifying a digital image comprised of a plurality of sub-windows and performing a first scan of the digital image using a coarse detection level. The first scan includes generating a skin color component for each of the sub-windows, generating an edge component for each of the sub-windows, and generating a simplified boosting-based component for each of the sub-windows. The sub-windows are eliminated when any of the skin color component, the edge component, or the simplified boosting-based component falls below predetermined levels. The subset of the sub-windows that were not eliminated by the first scan are scanned a second time using a fine detection level by generating a complete boosting-based component having a lower false-detect rate than the simplified boosting-based component for more accurately identifying sub-windows having a high likelihood of representing a face.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

In the following description, an example embodiment of a method and apparatus for face detection in a digital image is provided. The illustrated example uses a two phase process for scanning an input image: 1) a coarse detection phase; and 2) a fine detection phase. In an illustrated example, during the coarse detection phase, the non-face regions of the image are scanned at a large step to preserve computational resources. During the fine detection phase, the face regions of the image are scanned at smaller step to achieve an accurate detect rate, while still maintaining a reduced overall computational cost. The scale size of the sub-windows generated while scanning the image may also be varied to generate more sub-windows around the locations of real faces to enhance the detect rate, and reduce the number of sub-windows around other locations so as to improve the performance as well as false positives.

Figure 1:
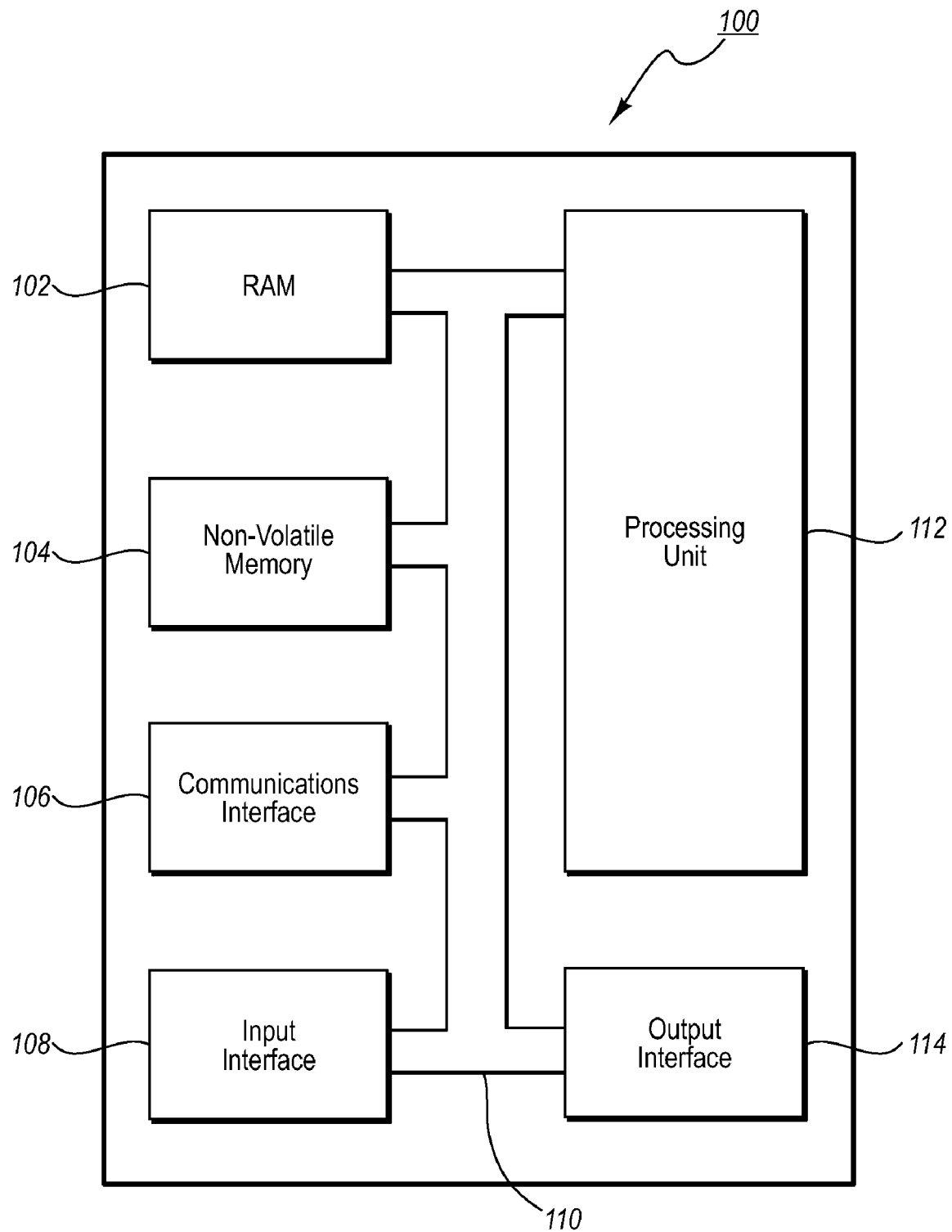
FIG. 1 illustrates a schematic diagram of one example of a computer system that may be employed for face detection.

FIG. 1 shows a computer system 100 for face detection in accordance with an example embodiment of the invention. The computer system 100 can be implemented as a personal computer, or similar type of programmable workstation, that can programmably execute face detection software to enable it to process images and detect faces therein. As is shown, such a computer system 100 comprises a processing unit 112, random access memory ("RAM") 102, non-volatile memory 104, a communications interface 106, an input interface 108 and an output interface 114, all in communication over a local bus 110. The processing unit 112 loads and executes software stored in non-volatile memory 104 for face detection. The processing unit 112 registers any ongoing calculations during face detection in RAM 102. The computer system 100 may be coupled to a network or server for storing images and results centrally via the communications interface 106. The input interface 108 may include a keypad and a mouse for interacting with the software for face detection, such as for modifying various settings/thresholds. The input interface 108 can also include a scanner (or similar image capture device) for capturing images to be analyzed for face detection. The output interface 114 includes a display that can visually present results of the face detection, if so desired, and can display settings of the software to allow for their adjustment.

Figure 2:
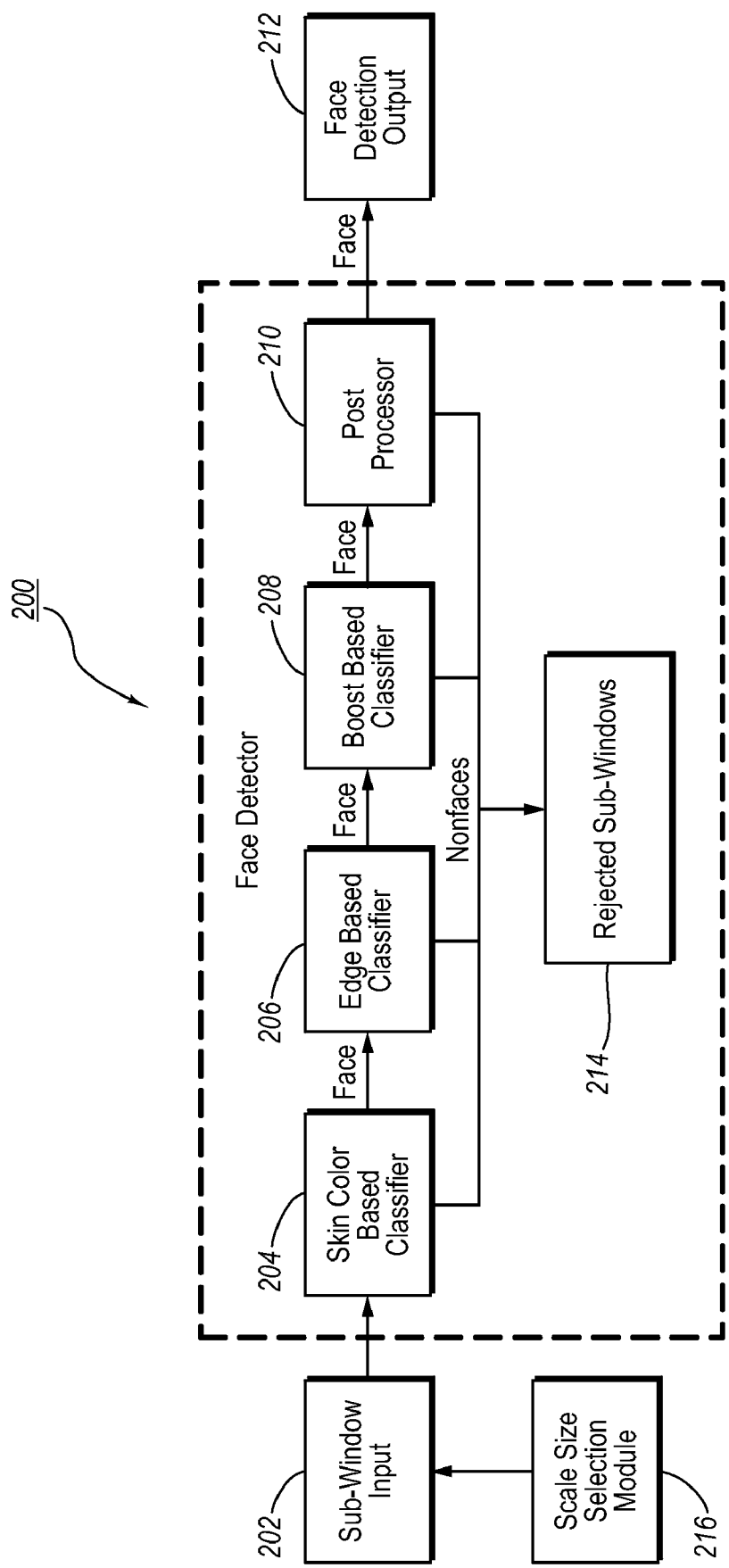
FIG. 2 illustrates a schematic diagram of one example of a face detection system, in accordance with the present invention.

Referring now to FIG. 2, a more detailed example is illustrated using a diagrammed reference to an example embodiment of a face detection system, denoted generally at 200. The example face detection system 200 is configured to detect the presence of faces within an image. The illustrated face detection system 200 includes a skin color based classifier 204, an edge based classifier 206, a boost based classifier 208, and a post processor 110. In order to detect faces within an image ('I'), the image may be broken down into one or more sub-windows. Each sub-window may be received from a sub-window input 202. In the illustrated example, the face detection system 200 can output the detected faces to the face detection output 212.

Upon receiving a sub-window from the sub-window input 202, the skin color based classifier 204, the edge based classifier 206, the boost based classifier 208, and the post processor 110 perform a two phase process in order to accurately and efficiently detect whether the sub-window likely represents a face. In the first phase, face detection system 200 scans the digital image using a coarse detection level to eliminate the sub-windows that have a low likelihood of representing a face. The eliminated sub-windows are represented by the rejected sub-windows bin 214.

In the example embodiment, if, at any stage of the analysis, one of the classifiers 204, 206, or 208 indicates that a sub-window does not represent a face, the analysis of the sub-window may be terminated. If none of the classifiers 204, 206 or 208 reject the sub-window as being a non-face image, then the sub-window is deemed to represent a face. Thus, if the sub-window fails the tests at any one stage, further processing resources and time are not wasted by further analyzing the sub-window.

During the second phase, the face detection system 200 scans the digital image using a fine detection level. The fine detection level identifies faces within the image using a higher accuracy level than the coarse detection level. The second phase only scans the sub-windows that were not rejected during the first phase. Therefore, although the fine detection level may have a higher computational cost than the coarse detection level used during the first phase, the fine detection level will typically only be used on a relatively small number of sub-windows that were not eliminated during the first phase. After the second phase eliminates the remaining sub-windows that are determined to be non-face images, the remaining sub-windows are output to the face detection output 212.

In the illustrated embodiment, each sub-window is analyzed using the skin color based classifier 204, the edge based classifier 206, and at least a portion of the boost classifier 206. The skin color based classifier 204 analyzes the sub-windows and eliminates the sub-windows having a low likelihood of representing a face image based on the colors of the sub-windows. For example, in one embodiment, the skin color based classifier 204 generates a skin-color component, '$F_s$'. If $F_s$ falls below a predetermined level, then the sub-window is classified as a non-face and is rejected. In one embodiment, given a sub-window, S(x, y, s, s|I), the skin based classifier 204 calculates $F_s(S)>0$ if S is identified by Fs as a face, and $F_s(S)<0$ otherwise, in which case the sub-window is rejected.

During the first phase, the edge based classifier 206 may analyze the sub-windows and eliminates additional sub-windows that have a low likelihood of representing a face based on an edge magnitude of the digital image within the sub-windows. For example, in one embodiment, the edge based classifier 206 generates an edge component '$F_e$'. If $F_e$ falls below a predetermined level, then the sub-window is classified as a non-face and is rejected. In one embodiment, given a sub-window, S(x, y, s, s|I), the edge based classifier 206 calculates $F_e(S)>0$ if S is identified by $F_e$ as a face, and $F_e(S)<0$ otherwise, in which case the sub-window is rejected.

Figure 3:
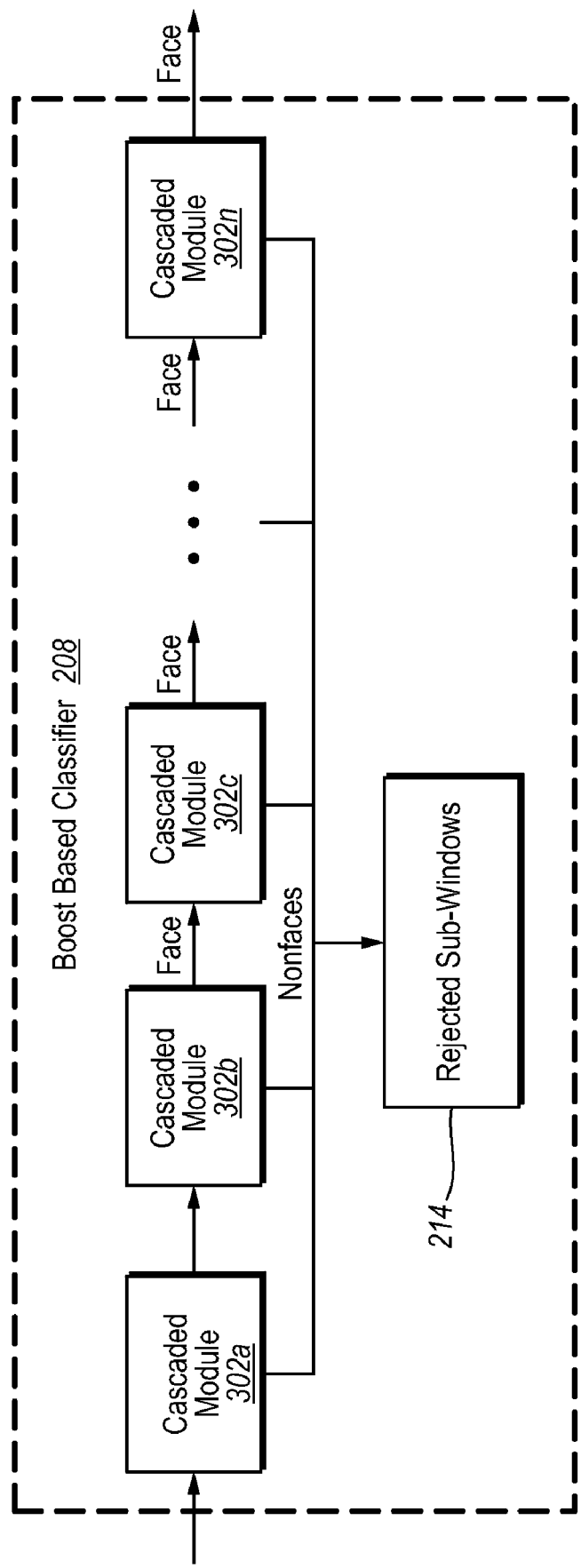
FIG. 3 illustrates a schematic diagram of one example of a boost based classifier, in accordance with the present invention.

Also during the first phase, at least a portion of the boost classifier 208 analyzes the sub-windows and eliminates additional sub-windows that have a low likelihood of representing a face image. In one embodiment, the boost classifier 208 may employ an AdaBoost-like technique. As is illustrated in the example of FIG. 3, the boost classifier 208 includes a plurality of cascaded modules 302a-302n. During the first phase, the sub-windows are analyzed by a first portion of the cascaded modules 302a-302n. For example, the sub-windows may be passed through the first five of the cascaded modules 302a-302n during the first phase.

Each subsequent cascaded module 302 has a lower false-detect tolerance level than the previous cascaded module. In other words, sub-windows that do not represent a face are more likely to be allowed (or passed through) by cascaded modules having high false-detect tolerance levels. By way of example, a sub-window that may successfully pass through the cascaded module 302a due to a high false-detect tolerance level may be eliminated by the subsequent cascaded module 302b, due to its lower false-detect tolerance level. However, all of the cascaded modules 302 used in the first phase of the face detection process have higher false-detect tolerance levels then the cascaded modules used in the second phase, as described below. Therefore, the cascaded modules 302 used in the first phase allow more non-face sub-windows to pass through, and have a lower computational impact than the cascaded modules used in the second phase.

In one embodiment, the sub-windows that were not eliminated during the first phase are reanalyzed by the remaining cascaded modules 302 during the second phase of the face detection process. By way of example, assuming that the boost based processor 208 includes fifteen cascaded modules 302, the first five of which were used during the first phase, then the second phase would consist of using the sixth through the fifteenth cascaded modules. As described previously, the false-detect tolerance level of the cascaded modules 302 used during the second phase is lower than the cascaded modules used during the first phase. In one embodiment, each subsequent cascaded module 302 used during the second phase has a lower false-detect tolerance level than the previous cascaded module. Because cascaded modules 302 having high false-detect tolerance levels use less processing power than cascaded modules having low false-detect tolerance levels, many non-face sub-windows can be eliminated prior to being analyzed by the computationally intensive second phase.

Once the sub-windows have been analyzed by both the first and second phases, the sub-windows may be processed by the post processor 210. The post processor 210 generates an output for identifying the representation of faces that exist within the digital image. The post-processing component may perform a variety of operations, such as merging of multiple detects for eliminating sub-windows with a low confidence, mirroring the face detector for fast verification, removal of overlapped positive candidates, removal of minimal and maximal positive candidates having a high chances of being false positives, and removal of unusual neighboring positive candidates.

In one embodiment, the face detection system 200 may further include a scale size selection module 216 for adaptively updating a scale size of the sub-windows. "Scale size" refers to the size of each sub-window being analyzed. By adaptively updating the scale sizes of the sub-windows, computational efficiency can be improved while having minimal impact on the detect rate or false positives. Each sub-window may be analyzed multiple times at different scale sizes in order to accurately detect faces of all different sizes. By adaptively updating the scale size, the non-face portions of the digital image can be analyzed using fewer scales sizes so as to improve the overall performance. Likewise, a greater number of scale sizes may be generated near the face portions in order to improve the detect rate as well as the false positives. For example, near the non-face portions, the sub-windows may be analyzed using a limited number of large scale sizes in order to reduce the amount of computational resources expended on the non-face regions. Near the face portions of the image, a wide range of scale sizes covering very small and very large sub-windows may be used in order to more accurately detect faces of all sizes.

In one embodiment, the adaptive updating of scale size of the sub-windows may be expressed as $S_i = s \cdot \Delta s^i$, where $\Delta s$ is the factor for scale updating, and where $s_i$ is the $i^{th}$ scale size used to scan a sub-window. Assuming that a sub-window has been scanned using the $s_{i-1}$ scale and the $s_{i+1}$ scale, the sub-window is only scanned using the $s_i$ scale size when positive candidates are found at either the $s_{i-1}$ scale size or the $s_{i+1}$ scale size. Furthermore, when scanning a sub-window using the $s_i$ scale size, the sub-window's neighboring regions are only examined if the neighboring regions also had positive candidates found at the $s_{i-1}$ scale and the $s_{i+1}$ scale size. Therefore, according to the present embodiment, a greater number of scale sizes is generated near the "positive candidates" (i.e., face portions), thereby improving the detection accuracy. Furthermore, by omitting certain scale sizes near the non-face portions, the computational costs are reduced.

As described previously, the skin color based classifier 204 is designed to reject many of the non-face sub-windows, and significantly reduce the burden of the subsequent classifiers 206 and 208. A description of example embodiments for implementing the skin color based classifier 204 will now be provided.

In one embodiment, a pre-trained skin-color model may be employed by the classifier to transform the input color image, 'I', to a skin-color map, where each pixel can be identified to be skin or non-skin color. In order to identify each pixel as skin or non-skin, the RGB values of each pixel ($z=[r,g,b]$) may be fed into a binary Bayesian classifier. The binary Bayesian classifier may determine a probability that each pixel represents skin or non-skin based on the RGB color value of the pixel. A set of sub-windows, such as a pre-trained skin-color model, may be used to train the system. During the training, each sub-window of each training digital image may be classified as representing a face or non-face, and the pixels of the sub-windows may be used to generate skin and non-skin histograms respectively. The histograms may include three-dimensional arrays, with each dimension corresponding to one of the R, G and B values in the RGB color space.

In one embodiment, the histograms are 32×32×32 in dimension. As training images are manually identified as representing or not representing a face, the appropriate face or non-face histogram is populated with the pixel values from the images. These histograms are then used to compute the Bayesian probability of pixel color values resulting from skin and non-skin subjects. That is, $$P(z|\text{skin}) = \frac{H_s(z)}{N_s}$$

is the probability that a particular color value, z, results from a skin subject, where $H_s(z)$ is the skin histogram, and $N_s$ is the skin histogram built from the training set having the same RGB values as the pixel being analyzed, and where $N_s$ is the total number of pixels contained in the skin histogram. Correspondingly, $$P(z|\text{nonskin}) = \frac{H_n(z)}{N_n}$$

is the probability that a particular color value, z, results from a non-skin subject, where $H_n(z)$ is the non-skin histogram built from the training set having the same RGB values as the pixel being analyzed, and where $N_n$ is the total number of pixels contained in the non-skin histogram.

Using these two probabilities, the Bayesian classifier for each pixel is determined to be $$g(z) = \begin{cases} 1, & \text{if } \frac{p(z|\text{skin})}{p(z|\text{nonskin})} \geq \theta_g \\ 0, & \text{otherwise} \end{cases},$$

where $\theta_g$ is a threshold that can be used to adjust the trade-off between correct detect rates and false positives. A binary skin/non-skin color map is thus generated for each sample region, with pixels deemed to represent skin being assigned a value of 1 and pixels deemed to represent non-skin being assigned a value of 0.

Figure 4:
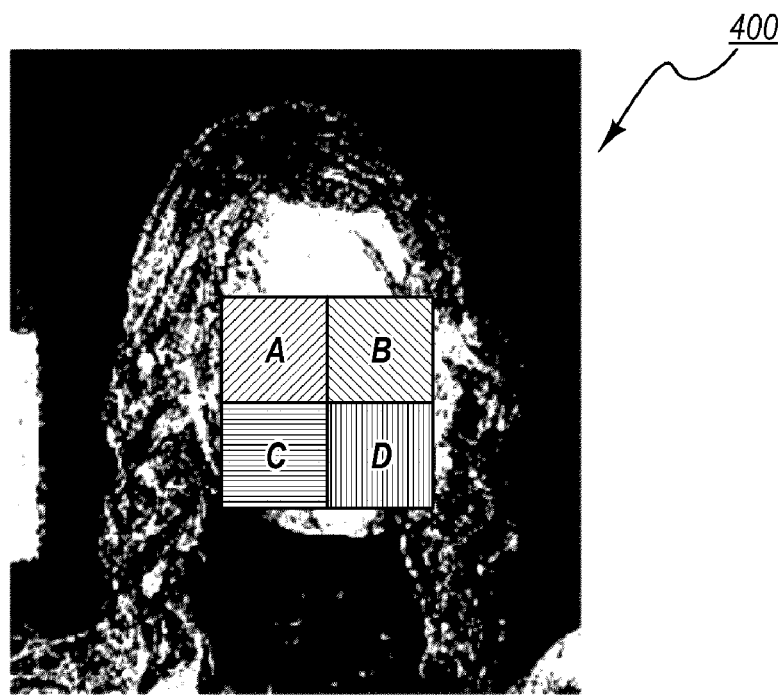
FIG. 4 illustrates four basic feature units applied on a skin-color map of an image.

In one embodiment, in order to reject the non-face sub-windows, the skin color based classifier 204 may divide each sub-window into at least two frames and apply the sub-window to a skin-color map. Various sum-based scalar features may be calculated by determining the sum of one or more combinations of the frames. A sub-window can then be rejected if one or more of the calculated sums fall below a predetermined level. For example, and in one embodiment, given the skin color map 'g(x)' of a sub-window x(x, y, s), seven sum-based scalar features may be extracted from the color map for color face detection. The skin color map g(x) may be divided into four rectangular frames for the purpose of generating the seven sum-based scalar features. FIG. 4 illustrates an example sub-window divided into four rectangular frames, A, B, C, and D, as applied to a skin-color map 400.

The seven sum-based scalar features may be determined by summing the four rectangles in different combinations, as follows:

$f_1 = \text{sum}(A) + \text{sum}(B) + \text{sum}(C) + \text{sum}(D)$ $f_2 = \text{sum}(A) + \text{sum}(C)$ $f_3 = \text{sum}(B) + \text{sum}(D)$ $f_4 = |\text{sum}(A) + \text{sum}(C) - \text{sum}(B) - \text{sum}(D)|$ $f_5 = \text{sum}(A) + \text{sum}(B)$ $f_6 = \text{sum}(C) + \text{sum}(D)$ $f_7 = |\text{sum}(A) + \text{sum}(B) - \text{sum}(C) - \text{sum}(D)|$ where sum(X) denotes the pixel sum of the pixel values g(x) in a sample region Z. All the features can be efficiently calculated by using a summed-area table or integral image of the skin-color probability map at any image scale. These scalar features are used to classify the sub-window x(x, y, s) by comparing them to the predetermined value, or threshold set, for each of the seven scalar features. That is, $$f_i(x) = \begin{cases} \geq \theta_i \Rightarrow \text{facepattern} \\ < \theta_i \Rightarrow \text{nonfacepattern} \end{cases}$$

where $\theta_i$ is a threshold that can be determined by evaluating results of this color feature using training data. The seven scalar features may be calculated and compared to the respective thresholds in a cascaded manner from $f_1$ to $f_7$. If any one of the scalar features for a sub-window fails to meet the respective threshold, the skin color based classifier 204 deems the sub-window to represent a non-face and the determination of the remainder of the seven scalar features and other classifiers is aborted.

As described previously, if the sub-window is deemed to not represent a face using the skin-color-based classifier 204, then the operation may be aborted prior to reaching the edge-based classifier 206. A description of example embodiments for implementing the edge based classifier 206 will now be provided. In one embodiment, the edge-based classifier 206 analyzes the sub-window by generating an edge map of the input image, I, using the edge magnitude of the image. In one embodiment, the edge magnitude is computed using the first-order derivative:

$$s(I) = \sqrt{\left(\frac{\delta I}{\delta x}\right)^2 + \left(\frac{\delta I}{\delta y}\right)^2}$$

In one embodiment, for practical purposes, a Soebel edge detection technique may be employed. The Soebel edge detection technique uses a 3×3 pixel kernel to determine the edge magnitude for each pixel based on the intensity value of the pixel in relation to the intensity values of the eight adjacent pixels. The result is an edge magnitude map that includes edge magnitude values for the digital image.

Figure 5:
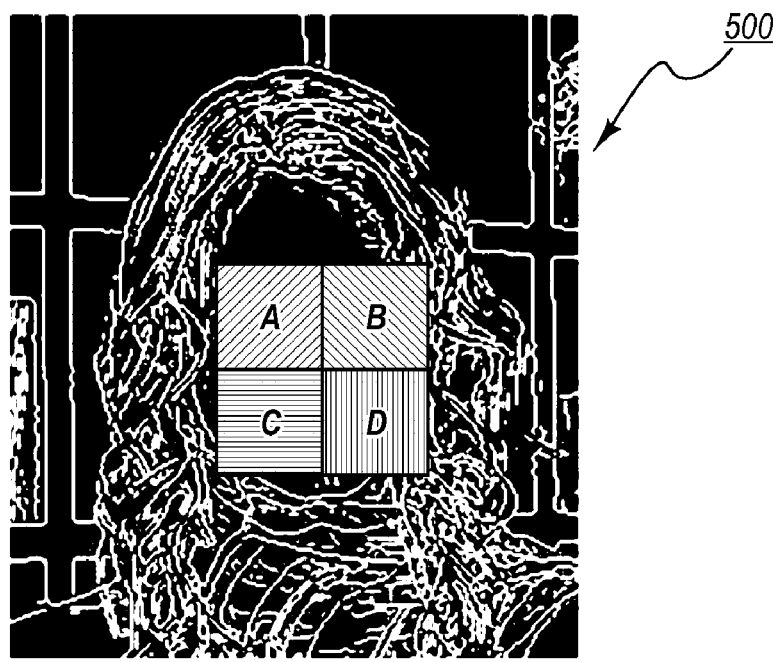
FIG. 5 illustrates four basic feature units applied on an edge map of the image of FIG. 4.

FIG. 5 illustrates an exemplary binary edge map for a sub-window of a digital image divided into four rectangular frames: A, B, C, and D. The binary edge map may be obtained by determining, $$e(I) = \begin{cases} 1, & \text{if } s(I) \geq \theta_e \\ 0, & \text{otherwise} \end{cases},$$

where s(I) is the edge magnitude and $\theta_e$ is an adjustable threshold. Given the edge map e(x) of a sub-window x(x,y,s), the seven scalar features $f_1$ to $f_7$ may be extracted in a similar manner as was described above. These scalar features may then compared to a threshold set for each of the seven scalar features, such as was described by $f_i(x)$ above. If any one of the scalar features for a sub-window fails to meet the respective threshold, the edge based classifier 206 deems the sub-window is deemed non-face by the edge based classifier 206, and the determination of the remainder of the seven scalar features and the classifiers may be aborted.

Figure 6:
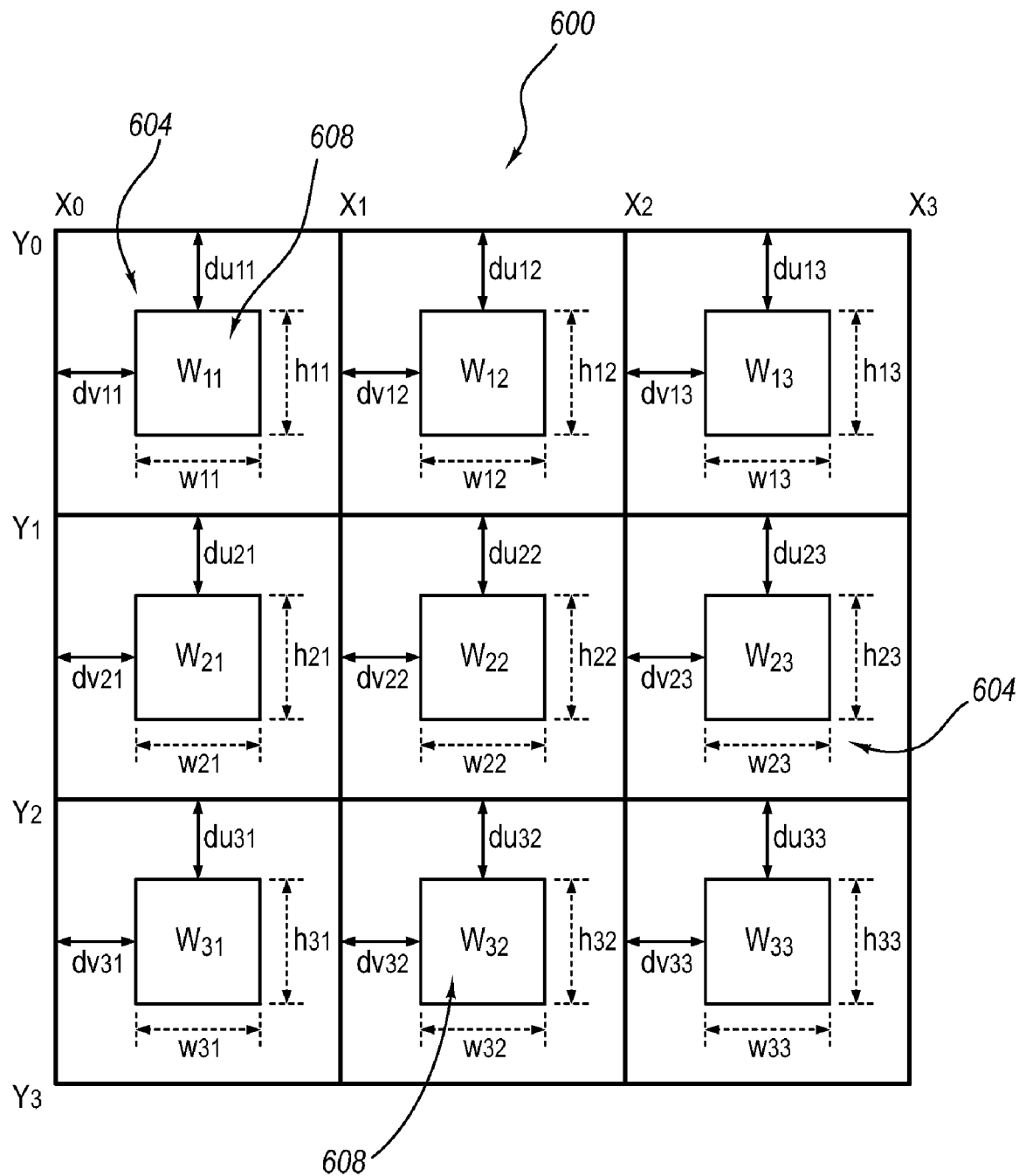
FIG. 6 illustrates a geometrical prototype template of a 3×3 rectangular feature.

As described previously, the boost based processor 208 includes a plurality of cascaded module 302, where a first group of modules are used during the first scan, and a second group of the cascaded modules are used during the second scan. A description of example embodiments for implementing the boost based processor 208 will now be provided. FIG. 6 illustrates a geometrical prototype 600 template in a sub-window x=Rectangle($X_0X_3Y_0Y_3$). The prototype template 600 is divided into nine rectangles $\{W_{ij}\}_{i,j=1}^3$ (604) in a three-by-three array, and within each frame is located a sample region 608. The prototype template 600 is shown spanning the horizontal range from $X_0$ to $X_3$, and the vertical range from $Y_0$ to $Y_3$. The locations and dimensions of the nine rectangular sample regions 604 are controlled by the following set of variables:

$\{X_k\}_{k=0}^3$, the x-coordinate of each dividing line between frames, $\{Y_k\}_{k=0}^3$, the y-coordinate of each dividing line between frames, $\{du_{ij}\}_{i,j=1}^3$, the vertical offset of the sample region from the top of each frame, $\{dv_{ij}\}_{i,j=1}^3$ the horizontal offset of the sample region from the top of each frame, $\{w_{ij}\}_{i,j=1}^3$, the width of each sample region, and $\{h_{ij}\}_{i,j=1}^3$, the height of each sample region.

The heights and widths of each frame may generally be equal, as are the heights and widths of each sample region within each frame.

A scalar weighting, $B_{ij} \in R$, may be associated with each sample region $\{W_{ij}\}_{i,j=1}^3$. A scalar feature of the sub-window may then be computed by a linearly weighted combination of the sums of values of the pixels of the nine sample regions; that is, $$f_n(\vartheta) = \sum_{i=1}^{3} \sum_{j=1}^{3} B_{ij} \cdot \text{sum}(W_{ij}),$$

where:

$\vartheta = \{\{X_k\}_{k=0}^3, \{Y_k\}_{k=0}^3, \{du_{ij}\}_{i,j=1}^3, \{dv_{ij}\}_{i,j=1}^3, \{w_{ij}\}_{i,j=1}^3, \{h_{ij}\}_{i,j=1}^3, \{B_{ij}\}_{i,j=1}^3\}$ is the set of all the variables, and sum($W_{ij}$) denotes the sum across all pixels of the sample region $W_{ij}$. The function sum($W_{ij}$) may be computed efficiently from a summed-area table, such as described in "Summed-area tables for texture mapping", F. Crow, SIGGGRAPH, 1984, vol. 18(3), pp. 207-212, the contents of which are incorporated by reference. Alternatively, the function sum($W_{ij}$) can be computed efficiently from an integral image, such as described in "Robust real-time face detection", Paul Viola and Michael J. Jones, *International Journal of Computer Vision*, vol. 57, May 2004, pp. 137-154, the contents of which are incorporated by reference. By varying the values of $\vartheta$, various scalar features can be generalized from a two-dimensional signal. Other techniques for computing sum($W_{ij}$) may also be used, as will be appreciated by one of ordinary skill in the art. For a sub-window of size 20×20 pixels, there are tens of thousands of such features. These features form an over-complete feature set for the sub-window.

Because the computation of the feature set can result in a larger feature set than is necessary, in one embodiment, an AdaBoost-like technique may be employed to select the most significant features that will be used during face detection. In general, given a set of training samples, the AdaBoost-like technique may determine weak classifiers, and then linearly combine the weak classifiers to form strong classifiers. The strong classifiers may then be cascaded to form the cascaded modules 302, as illustrated in FIG. 3.

A set of N labeled training examples is given as ($x_1$; $y_1$), ..., ($x_N$; $y_N$), where $y_j \in \{+1,-1\}$ is the class label for the example $x_i \in R^n$. AdaBoost may utilize an available procedure for learning a sequence of weak classifiers $h_m(x)$ (m=1, 2, ..., M) from the training examples, with respect to the distributions $w_j^{(m)}$ of the examples. In one embodiment, each weak classifier $h_m(x)$ may be associated with a single scalar feature $f_i$. A stronger classifier $H_M(x)$ may be calculated by a linear combination of the M weak classifiers, that is:

$$H_M(x) = \sum_{m=1}^{M} h_m(x) - \theta_b$$

where $\theta_b$ is the threshold for controlling the tradeoff of detect rate and false positive. The classification of x may be obtained as $\hat{y}(x)$=sign $[H_M(x)]$ and the normalized confidence score may be obtained as $|H_M(x)|$. The form of $h_m(x)$ may include a discrete function, or alternatively, many AdaBoost variants may be employed that use real $h_m(x)$ have.

In one embodiment, a technique referred to as a "gentle AdaBoost" may be employed for minimizing the following weighted least square error, $$E(f_i) = \sum_{j=1}^{N} w_j (h_m(f_i, x_j) - y_j)^2$$

where $$h_m(f_i, x_j) = \begin{cases} v_i, & \text{if } f_i \geq \theta_i \\ \mu_i, & \text{otherwise} \end{cases}, \text{ with } v_i, \mu_i \in [-1, 1]$$

$$v_i = \frac{W_+^r - W_-^r}{W_+^r + W_-^r},$$

$$\mu_i = \frac{W_+^l - W_-^l}{W_+^l + W_-^l},$$

$$W_+^r = \sum_{j: (y_j=1) \& (f_i(x_j) \geq \theta_i)} w_j,$$

$$W_-^r = \sum_{j: (y_j=-1) \& (f_i(x_j) \geq \theta_i)} w_j,$$

$$W_+^l = \sum_{j: (y_j=1) \& (f_i(x_j) < \theta_i)} w_j,$$

$$W_-^l = \sum_{j: (y_j=-1) \& (f_i(x_j) < \theta_i)} w_j,$$

In one embodiment, the optimal parameters of $h_m$ together with the best feature $f_*$ can be determined by minimizing the error of the weighted least square error, $E(f_i)$, that is:

$$f_* = \underset{f_i}{\arg\min} E(f_i)$$

In this manner, AdaBoost learning may be used to select the most significant features from the proposed over-complete feature set.

A boosted strong classifier effectively eliminates a large portion of non-face sub-windows while maintaining a high detection rate for sub-windows that represent face. A number of the strong classifiers, $H_M(x)$, are trained and organized in a cascaded manner, as was described previously in FIG. 3. As described above, in the present invention, a first portion of the strong classifiers (i.e., cascaded modules 302) may be used during a first scan of an image, while the remaining and more accurate strong classifiers may be used during a second scan of the image. Therefore, sub-windows which fail to pass the first scan will not be further processed by the subsequent strong classifiers included during the second scan. The sub-window x is finally considered to represent a face when it passes both the first and the second scan. This strategy can significant speed up the detection process and reduce false positives.

Figure 7:
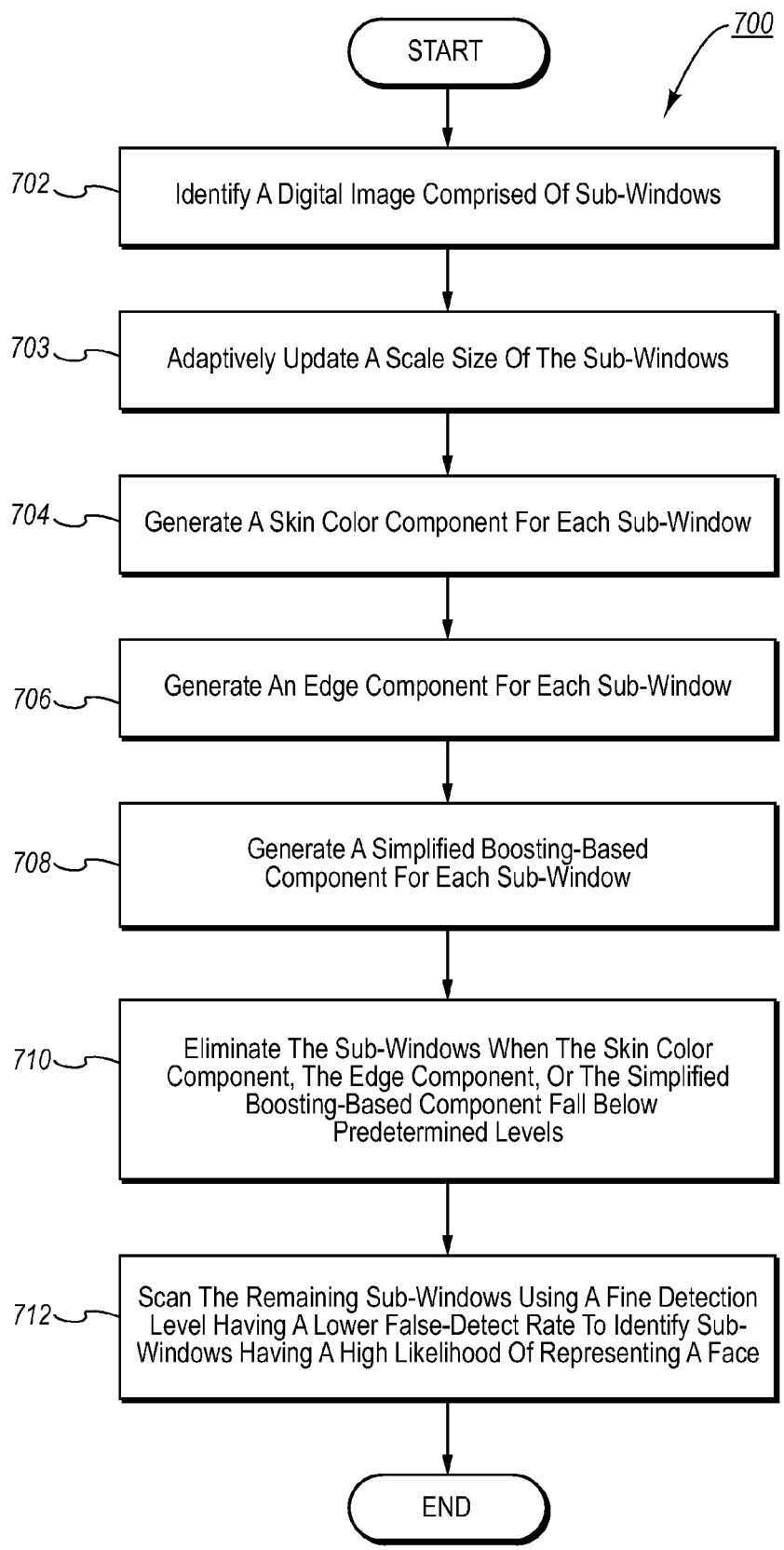
FIG. 7 illustrates a flow diagram describing one example of a method of adaptively scanning a digital image for face detection.

Referring now to FIG. 7, a method 700 is illustrated of adaptively scanning a digital image for face detection. The method 700 may be practiced, for example, in a computer system that includes classifying modules for classifying an image. The server system may include one or more computer-readable media having computer-executable instructions, that when executed, implement the method 700.

The method 700, beginning at step 702, identifies a digital image comprised of a plurality of sub-windows. The method 700 analyzes the sub-windows to detect the representation of a face within each sub-window. To improve face detection capabilities, the method 700, at program step 703, adaptively updates a scale size of the sub-windows so that sub-windows of various scale-sizes are scanned. For example, the scale sizes of the sub-windows may be adaptively updated so that a greater number of scale sizes are generated near the identified faces than near the non-face portions of the digital image. By searching a greater number of scale sizes near face portions of the image, the method 700 is more likely to identify faces of all sizes.

The method 700 then initiates a first scan of the digital image using a coarse detection level. In particular, at program step 704, the method 700 generates a skin color component for each of the sub-windows. Referring again to FIG. 2, the skin color based classifier 704 may be employed for generating the skin color component.

In one embodiment, generating the skin color component for each of the sub-windows also includes identifying a sub-window of the digital image, dividing the identified sub-window into at least two frames, and applying the two frames to a skin-color map. One or more skin color components may then be generated by summing various combinations of the frames, as was described above in reference to the seven sum-based scalar features. If any of the skin color components (i.e, features) falls below a predetermined level, it can then be designated as a non-face region.

The method 700 continues the first scan of the digital image, at step 706, by generating an edge component for each of the sub-windows. In one embodiment, generating an edge component for each of the sub-windows may further include calculating an edge magnitude for each pixel within the digital image. Referring again to FIG. 2, the edge component may be generated by the edge based classifier 206.

The method 700 further includes, at step 708, generating a simplified boosting-based component for each of the sub-windows. Referring again to FIGS. 2 and 3, the simplified boosting-based component may be generated by a first portion of a plurality of cascaded modules 302 within a boost based classifier 208. In one embodiment, each subsequent classifier, or cascaded module, has a lower false-detect rate than the previous. The simplified boosting-based component falls below the predetermined level if the identified sub-window fails to pass one of the classifiers.

At program step 710, the method 700 further eliminates sub-windows if any of the skin color component, the edge component, or the simplified boosting-based component falls below predetermined threshold levels. The predetermined threshold levels for the skin color component, the edge component, and the simplified boosting-based component, may vary if necessary. As described previously, the sub-windows are not necessarily rejected after the completion of the first scan of the image. Instead, sub-windows may be rejected at each step within the first scan.

The subset of the sub-windows that were not eliminated at step 710 are then scanned a second time, at step 712, using a fine detection level. The second scan may generate a complete boosting-based component having a lower false-detect rate than the simplified boosting-based component generated at 708 for more accurately identifying sub-windows having a high likelihood of representing a face. In one embodiment, performing the second scan of the digital image using the fine detection level further includes passing a sub-window through a second portion of the classifiers within the boost based classifier. Each classifier within the second portion of classifiers has a lower false-detect rate than any of the first portion of the classifiers so as to improve accuracy.

In one embodiment, the method 700 further includes processing the results of the second scan to generate an output for identifying the existence of faces within the digital image, for example, using the post processor 210, illustrated in FIG. 2.

Embodiments herein may comprise a special purpose or general-purpose computer including various computer hardware implementations. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for adaptively scanning a digital image for detecting an object, the method comprising:
using a processing unit to:
identify a digital image comprised of a plurality of sub-windows;
perform a first scan of the digital image using a coarse detection level to eliminate the sub-windows having a low likelihood of representing the object, leaving a subset of the sub-windows that have not been eliminated;
perform a second scan of the subset of the sub-windows using a fine detection level having a higher accuracy level than the coarse detection level, to identify sub-windows having a high likelihood of representing the object; and
adaptively update a sub-window scale size used during the first scan and the second scan so that a greater number of sub-window scale sizes are generated near the identified sub-windows having a high likelihood of representing the object than near the sub-windows having a low likelihood of representing the object.

2. The method as recited in claim 1, wherein performing the first scan of the digital image data using the coarse detection level comprises:
generating a color component for each of the sub-windows;
generating an edge component for each of the sub-windows; and
generating a simplified boosting-based component for each of the sub-windows;
wherein the sub-windows are eliminated when any of the color component, the edge component, or the simplified boosting-based component fall below predetermined levels.

3. The method as recited in claim 2, wherein generating the color component for each of the sub-windows further comprises:
identifying a sub-window of the digital image;
dividing the identified sub-window into at least two frames;
applying the at least two frames to a color map; and
generating one or more color components by summing one or more combinations of the at least two frames;
wherein the identified sub-window is eliminated when any of the one or more color components falls below a predetermined level.

4. The method as recited in claim 2, wherein generating an edge component for each of the sub-windows further comprises calculating an edge magnitude for each pixel within the digital image.

5. The method as recited in claim 2, wherein generating a simplified boosting-based component for each of the sub-windows further comprises:
identifying a sub-window of the digital image; and
passing the identified sub-window through a first portion of a plurality of classifiers, wherein each subsequent classifier has a lower false-detect rate than a previous classifier;
wherein the simplified boosting-based component falls below the predetermined level if the identified sub-window fails to pass one of the classifiers.

6. The method as recited in claim 5, wherein performing the second scan of the digital image using the fine detection level comprises:
passing the identified sub-window through a second portion of the plurality of classifiers, wherein each of the second portion of the plurality of classifiers has a lower false-detect rate than any of the first portion of the plurality of classifiers.

7. The method as recited in claim 1, further comprising processing the results of the second scan to generate an output for identifying the existence of objects within the sub-windows.

8. A face detection system, comprising:
a processing unit that includes:
a skin color based classifier configured to analyze a digital image having a plurality of sub-windows during a first scan to eliminate the sub-windows that have a low likelihood of representing a face based on the colors of the sub-windows;
an edge based classifier coupled to the skin color based classifier and configured to analyze the digital image during the first scan to eliminate additional sub-windows that have a low likelihood of representing a face based on an edge magnitude of the digital image within the sub-windows;
a boost classifier coupled to the edge based classifier having a plurality of cascaded modules, wherein at least a first portion of the cascaded modules are configured to analyze the digital image during the first scan to eliminate additional sub-windows that have a low likelihood of representing a face based on a first false-detect tolerance level and leaving a subset of sub-windows that have not been eliminated, and a second portion of the cascaded modules are configured to analyze during a second scan the subset of sub-windows and to eliminate additional sub-windows that have a low likelihood of representing a face based on a second false-detect tolerance level that is lower than the first false-detect tolerance level used during the first scan; and
a scale size selection module configured to adaptively update a sub-window scale size used during the first scan and the second scan so that a greater number of sub-window scale sizes are generated near sub-windows that are not eliminated and a lesser number of sub-window scale sizes are generated near the sub-windows that are eliminated.

9. The face detection system as recited in claim 8, further comprising a post processor coupled to the boost classifier to process the results of the boost classifier and to generate an output for identifying the representation of faces that exist within the digital image.

10. The face detection system as recited in claim 8, wherein the skin color based classifier is further configured to generate a skin color component for each of the sub-windows, the edge based classifier is further configured to generate an edge component for each of the sub-windows, and the boost classifier is further configured to generate a simplified boosting-based component for each of the sub-windows, and wherein the sub-windows are eliminated when any of the skin color component, the edge component, or the simplified boosting-based component fall below predetermined levels.

11. The face detection system as recited in claim 8, wherein the skin color based classifier is further configured to divide each sub-window into at least two frames, apply the at least two frames to a skin-color map, and calculate the sum of one or more combinations of the at least two frames in order to eliminate the sub-window if the calculated sum falls below a predetermined level.

12. The face detection system as recited in claim 8, wherein the plurality of cascaded modules of the boost classifier are configured to analyze each of the sub-windows in successive order, and wherein each subsequent cascaded module is configured to have a lower false-detect rate than a previous cascaded module, and wherein the boost classifier is configured to reject one of the sub-windows if it fails to pass one of the cascaded modules.

13. The face detection system as recited in claim 8, wherein the first scan performed by the boost classifier is configured to have a lower computational requirement than the second scan performed by the boost classifier.

14. In a computer system that includes classifying modules for classifying an image, a computer program product configured to implement a method of adaptively scanning a digital image for face detection, the computer program product comprising one or more computer readable media having stored thereon computer executable instructions that, when executed by a processor, cause the computer system to perform the following:
   identify a digital image comprised of a plurality of sub-windows;
   perform a first scan of the digital image using a coarse detection level, the first scan causing the computer system to:
      generate a skin color component for each of the sub-windows;
      generate an edge component for each of the sub-windows; and
      generate a simplified boosting-based component for each of the sub-windows;
      wherein non-face sub-windows are eliminated when any of the skin color component, the edge component, or the simplified boosting-based component fall below predetermined levels, leaving a subset of the sub-windows that have not been eliminated;
   perform a second scan of the subset of the sub-windows using a fine detection level by generating a complete boosting-based component having a lower false-detect rate than the simplified boosting-based component for more accurately eliminating the non-face sub-windows and identifying sub-windows having a high likelihood of representing a face; and
   adaptively update a sub-window scale size used during the first scan and the second scan so that a greater number of sub-window scale sizes are generated near the identified sub-windows having a high likelihood of representing the object than near the non-face sub-windows.

15. The method as recited in claim 14, wherein the computer executable instructions that generate the skin color component for each of the sub-windows further comprise instructions, that when executed:
   identify a sub-window of the digital image;
   divide the identified sub-window into at least two frames;
   apply the at least two frames to a skin-color map; and
   generate one or more skin color components by summing one or more combinations of the at least two frames;
   wherein the identified sub-window is eliminated when any of the one or more skin color components falls below a predetermined level.

16. The method as recited in claim 14, wherein the computer executable instructions that generate a simplified boosting-based component for each of the sub-windows further comprise instructions, that when executed:
   identify a sub-window of the digital image; and
   pass the identified sub-window through a first portion of a plurality of classifiers, wherein each subsequent classifier has a lower false-detect rate than a previous classifier;
   wherein the simplified boosting-based component falls below the predetermined level if the identified sub-window fails to pass one of the classifiers.

17. The method as recited in claim 16, wherein the computer executable instructions that perform the second scan of the digital image further comprise instructions, that when executed:
   pass the identified sub-window through a second portion of the plurality of classifiers, wherein each of the second portion of the plurality of classifiers has a lower false-detect rate than any of the first portion of the plurality of classifiers.

* * * * *